(12) United States Patent
Haven et al.

(10) Patent No.: US 12,125,242 B2
(45) Date of Patent: Oct. 22, 2024

(54) METHOD AND SYSTEM FOR REGISTERING A 3D SENSOR WITH AN AUTONOMOUS MANIPULATOR

(71) Applicant: Liberty Reach Inc., Clearwater, ID (US)

(72) Inventors: G. Neil Haven, Clearwater, ID (US); Fansheng Meng, Ann Arbor, MI (US)

(73) Assignee: Liberty Robotics Inc., Dexter, MI (US)

( * ) Notice: Subject to any disclaimer, the term of this patent is extended or adjusted under 35 U.S.C. 154(b) by 221 days.

(21) Appl. No.: 17/569,606

(22) Filed: Jan. 6, 2022

(65) Prior Publication Data

US 2023/0215049 A1  Jul. 6, 2023

(51) Int. Cl.
| | |
|---|---|
| *G06T 7/80* | (2017.01) |
| *B25J 9/16* | (2006.01) |
| *B25J 13/08* | (2006.01) |
| *H04N 13/246* | (2018.01) |

(52) U.S. Cl.
CPC ............. *G06T 7/85* (2017.01); *B25J 9/1692* (2013.01); *B25J 9/1697* (2013.01); *B25J 13/08* (2013.01); *H04N 13/246* (2018.05)

(58) Field of Classification Search
CPC ............. G06T 7/85; G06T 2207/10016; G06T 2207/10028; G06T 2207/30244; G06T 7/73; B25J 9/1692; B25J 9/1697; B25J 13/08; H04N 13/246; G05B 2219/39008
See application file for complete search history.

(56) References Cited

U.S. PATENT DOCUMENTS

| | | |
|---|---|---|
| 3,239,941 A | 3/1966 | Ahmer |
| 3,978,337 A | 8/1976 | Nickles et al. |
| 4,653,104 A | 3/1987 | Tamura |
| 4,687,325 A | 8/1987 | Corby, Jr. |
| 6,321,137 B1 | 11/2001 | De Smet |
| 6,822,748 B2 | 11/2004 | Johnston et al. |
| 7,275,008 B2 | 9/2007 | Plyvanainen |
| 8,150,142 B2 | 4/2012 | Freedman et al. |
| 8,224,071 B2 | 7/2012 | Ramalingam et al. |
| 8,989,897 B2 | 3/2015 | de Smet |
| 9,070,285 B1 | 6/2015 | Ramu et al. |

(Continued)

OTHER PUBLICATIONS (Alexis Brumm, How to Determine Which Laser Scanning Registration Method is Right for You, May 2020, Point of Beginning, p. 1, https://engineeringcenter.bnpmedia.com/courses/pob-magazine/how-to-determine-which-laser-scanning-registration-method-is-right-for-you/1/) (Year: 2020).*

(Continued)

*Primary Examiner* — Adam R Mott
*Assistant Examiner* — Alyzia N Dilworth
(74) *Attorney, Agent, or Firm* — Brooks Kushman P.C.

(57) ABSTRACT

A method and system for registering a 3D sensor with an autonomous manipulator is provided. The 3D sensor has a field of view and a sensor coordinate system. The autonomous manipulator is a vision-guided manipulator having a work envelope and a manipulator coordinate system. The method includes moving a registration target relative to the sensor in the field of view of the sensor in the work envelope to obtain a plurality of depth maps or images of the target. The depth maps or images are processed to obtain a plurality of extrinsic registration parameters between the manipulator and the sensor.

20 Claims, 3 Drawing Sheets

(56) References Cited

U.S. PATENT DOCUMENTS

| | | | |
|---|---|---|---|
| 9,251,590 | B2 | 2/2016 | Sharp et al. |
| 9,333,649 | B1 | 5/2016 | Bradski et al. |
| 9,420,265 | B2 | 8/2016 | Taguchi et al. |
| 9,445,079 | B2 | 9/2016 | Gotschlich |
| 10,049,443 | B2 | 8/2018 | Bartos et al. |
| 10,088,553 | B2 | 10/2018 | Zeng et al. |
| 10,228,864 | B1 | 3/2019 | Zelenov et al. |
| 10,369,698 | B1 | 8/2019 | Islam et al. |
| 10,401,144 | B2 | 9/2019 | Pettersson et al. |
| 10,421,189 | B2 | 9/2019 | Wallack et al. |
| 10,552,981 | B2 | 2/2020 | Li-Chee-Ming et al. |
| 10,591,277 | B2 | 3/2020 | Kallay et al. |
| 10,661,442 | B2 | 5/2020 | Wang et al. |
| 10,726,579 | B1 | 7/2020 | Huang |
| 10,776,949 | B2 | 9/2020 | Haven et al. |
| 10,778,874 | B2 | 9/2020 | LeGuilloux et al. |
| 10,795,006 | B2 | 10/2020 | Garcia et al. |
| 10,812,778 | B1 | 10/2020 | Wang et al. |
| 10,838,049 | B1 | 11/2020 | Schwiesow |
| 10,841,496 | B2 | 11/2020 | Wheeler et al. |
| 10,841,562 | B2 | 11/2020 | Heidemann et al. |
| 11,029,713 | B2 | 6/2021 | Haven et al. |
| 2013/0329012 | A1 | 12/2013 | Bartos et al. |
| 2014/0125772 | A1 | 5/2014 | Myokan et al. |
| 2016/0055268 | A1 | 2/2016 | Bell et al. |
| 2016/0059417 | A1 | 3/2016 | Shirakyan et al. |
| 2016/0297068 | A1* | 10/2016 | Thibodeau ............ G05B 19/408 |
| 2018/0120218 | A1 | 5/2018 | Shultis et al. |
| 2019/0332084 | A1 | 10/2019 | Haven |
| 2020/0276713 | A1 | 9/2020 | Zhang et al. |
| 2020/0410712 | A1 | 12/2020 | Haven et al. |
| 2021/0150760 | A1 | 5/2021 | Haven et al. |
| 2023/0165649 | A1* | 6/2023 | Fitzsimons ............ A61B 34/30 700/245 |

OTHER PUBLICATIONS

International Searching Authority, International Search Report and the Written Opinion for International Application No. PCT/US2023/10291, mailed Apr. 13, 2023.

Wolfgang Foerstner, IEEE International Conference on Computer Vision, Institute of Geodesy and Geoinformation, Univerty of Bonn, Germany, Efficient and Accurate Registration of Point Clouds with Plane to Plane Correspondence, Oct. 2017.

Yu-Tseh Chi, Jeffrey Ho and Ming-Hsuan Yang, A Direct Method for Estimating Planar Projective Transform, Computer and Information Science and Engineering, University of Florida, Gainesville, FL 32611, USA, Electrical Engineering and Computer Science, University of California at Merced, Merced, CA 95344, USA, Nov. 2020.

Sumith YD, Fast Geometric Fit Algorithm for Sphere Using Exact Solution, Syracuse University, Mechanical and Aerospace Engineering Department, Syracuse, NY 13244 USA, Jun. 2015.

Richard Szeliski, Image Alignment and Stitching: A Tutorial, Technical Report, MSR-TR-2004-92, Last Updated, Dec. 10, 2006.

Junhui Huang, Zhao Wang, Jianmin Gao, Youping Huang and David Peter Towers, High-Precision Registration of Point Clouds Based on Sphere Feature Constraints, Received Nov. 24, 2016; Accepted Dec. 27, 2016; Published: Dec. 30, 2016.

Craig M. Shakarji, National Institute of Standards and Technology, Gaithersburg, MD 20899-0001, Journal of Research of the National Institute of Standards and Technology, vol. 103, No. 6, Nov.-Dec. 1998.

Christoph Dold, Claus Brenner, ISPRS Commission V Symposium "Image Engineering and Vision Metrology", Registration of Terrestrial Laser Scanning Data Using Planar Patches and Image Data, IAPRS vol. XXXVI, Part 5, Dresden Sep. 25-27, 2006.

The International Bureau of WIPO, International Preliminary Report on Patentability for International Application No. PCT/US2023/010291 issued Jun. 20, 2024.

* cited by examiner

METHOD AND SYSTEM FOR REGISTERING A 3D SENSOR WITH AN AUTONOMOUS MANIPULATOR

CROSS-REFERENCE TO RELATED APPLICATION

This application is related to co-pending patent application entitled "Machine Vision-Based Method and System for Locating Objects within a Scene Containing the Objects," filed Oct. 1, 2021, and having U.S. Ser. No. 17/491,975.

TECHNICAL FIELD

At least one aspect of the present invention is generally related to methods and systems for registering 3D sensors with autonomous manipulators and, in particular, to such methods and systems which calibrate the manipulators for vision.

Overview

Robots and other autonomous systems transport, transform, and manipulate workpieces, whether they are manufactured goods, items under assembly, consumer goods, conveyances, livestock, or people. Due to position uncertainties, environmental changes, and object drift, autonomous systems often must be, in some sense, aware of changes in their surroundings to perform their assigned duties accurately and reliably. This awareness requires visual, geometric, audio, and/or haptic feedback from the environment. Robots are granted enhanced eyes through which they may sense the surface geometry of objects in their field of view. Volumetric (3D) sensors (Time of Flight, U.S. Pat. No. 3,978,337, coded pattern, U.S. Pat. No. 4,653,104, multipoint disparity, U.S. Pat. No. 8,150,142, laser-scanned single-point disparity, U.S. Pat. No. 4,687,325 and plenoptic sensors, U.S. Pat. No. 10,778,874) which deliver objects' geometry as depth images (sometimes called depth maps) are examples of such eyes. In addition to surface geometry, some volumetric sensors also deliver objects' visible likenesses projected onto imaging planes as color images or grayscale images. These are the familiar images from present-day digital cameras.

Volumetric sensing means, together with computational means and mechanical systems, can be used to guide fixed and mobile manipulators. Systems relying on volumetric sensors can achieve accuracies and reliabilities which meet many present-day quality assurance, assemblage, and materials handling requirements.

The following U.S. patent documents assigned to the same assignee as the present application are related to at least one embodiment of the invention: 2013/0329012; 2018/0120218; U.S. Pat. No. 10,049,443; 2019/0332084; U.S. Pat. Nos. 10,591,277; 10,776,949; 2020/0410712; 2021/0150760; and U.S. Pat. No. 11,029,713.

A useful distinction between volumetric or "3D" sensors which deliver direct geometrical renditions as depth maps and/or ordered sets of Cartesian Coordinates (so-called 'point clouds'), and "2D" sensors which deliver color or grayscale images, but do not deliver direct geometrical information.

To operate together, volumetric sensors and autonomous manipulators must be 'registered' into a common coordinate frame. In practice, this often means that a transformation must be determined to translate between the default coordinate systems of one or more volumetric sensors, and the working coordinate systems of one or more autonomous manipulators. This registration transformation, when embodied as a linear transformation, is known as an 'extrinsic transform' or a 'registration transform'. The process of obtaining a registration transformation is the process of sensor 'registration.'

Accurate and reliable interactions between machinery and work pieces have long been the goal of designers of automation; vision-guided robots are not the first advances in such automation. For instance, there is an abundant literature and patent history regarding the calibration and accurate use of Coordinate Measurement Machines (CMMs). For example, U.S. Pat. No. 3,239,941 describes a device for accurately locating and marking locations on a fixtured workpiece, wherein the registration of the workpiece relative to the (purely mechanical) sensing and marking means is achieved by mechanically positioning and clamping the workpiece relative to physical 'zero locator' abutments within a rigid mechanical framework. With time, the sensing and marking means for CMMs has become more electro-mechanical, autonomous, and robotic. The 'zero locator' coordinate guides have become more abstract. More recent of the patents in this thread may deploy lasers (U.S. Pat. No. 8,989,897), 2D sensing (e.g. U.S. Pat. No. 10,401,144) or 3D sensing (U.S. Pat. No. 8,224,071, which registers points to a polyhedral reference monument for robot calibration). Robot-based CMMs employ involved and careful procedures for registration of robot end-effectors. These procedures are designed for the most demanding industrial tasks and regularly maintain accuracies on the order of microns or fractions of a mil (~25 microns). Such accuracies are too slow to achieve, too difficult to maintain, and unnecessary for many assembly, transport, and materials handling tasks, which tend only to require accuracies on the order of a single mm or even a single centimeter. Although there is some commonality, the registration of volumetric sensors tends to employ different techniques than are used for coordinate measuring machines.

There is also a rich literature and patent history regarding the determination of the intrinsic and extrinsic parameters of 2D sensors for photogrammetry in industrial, military, and civil engineering contexts. A modern example involves presenting multiple instances of a printed calibration pattern mounted upon a robot to a 2D sensor, which is thereby registered into the robot's coordinate system (see U.S. Pat. No. 10,369,698) and may hence interact with the robot using the robot's preferred coordinate system. Typical methods for registration of 2D sensors differ in kind from the registration of volumetric sensors in that the data used for registration does not include depth maps, so there are no Cartesian Coordinates directly available for registration. A point p in 3D Cartesian Coordinates is typically represented by listing its projections along the 3 coordinate axes: the x-axis, y-axis, and z-axis; for example: $p=\{x, y, z\}$.

Figure 1:
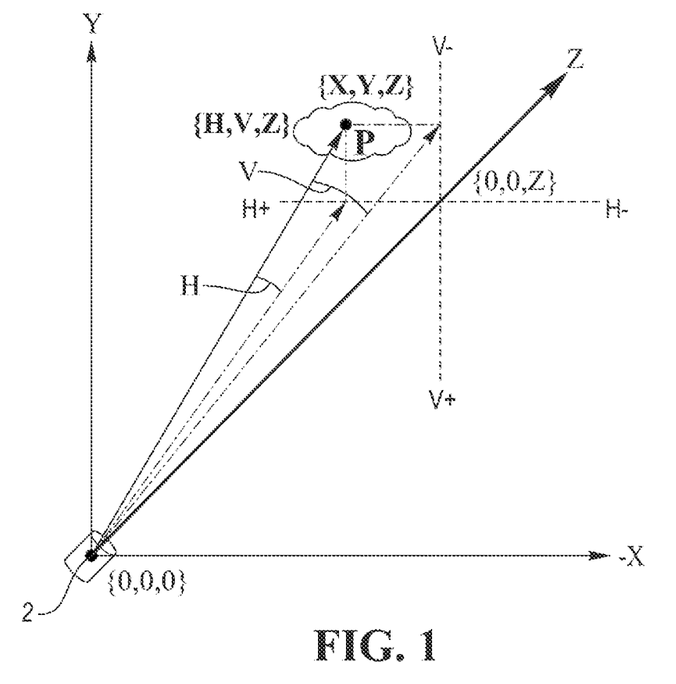
FIG. 1 is a graph showing the Cartesian coordinate system with an overlaid sensor (aka "perspective") coordinate system; a point in 3-space is determined by the three coordinates {X, Y, Z} in Cartesian coordinates: a point (i.e. the same point) in 3-space is determined by the three coordinates {H, V, Z} in sensor (perspective) coordinates; perspective coordinates bear a formal similarity to spherical coordinates in that the first two coordinates "H" and "V" are indicative of the exit angle of the ray pointing at a target point—the final coordinate "Z" is measured as a distance along a z-axis.

The grayscale or color images from 2D sensors are presented in 3D Projective Coordinates (aka Homogeneous Coordinates) $\{h, v, z, 1\}$. Referring to FIG. 1 (and the sensor 2 shown therein), a 3D point p, represented by the triple $\{x, y, z\}$ in Cartesian Coordinates, is represented in 3D Projective Coordinates as any quadruple $p=\{dh, dv, dz, d\}$, where $h=x/z$ and $v=y/z$ and $d\neq 0$. The slope h is the "image row coordinate". The slope v is the "image column coordinate". Any two quadruples $\{d_1 h, d_1 v, d_1 z, d_1\}$ and $\{d_2 h, d_2 v, d_2 z, d_2\}$ are equal so long as $d\neq 0$ and $d\neq 0$. Since, by this definition of equality, the scale factor d is arbitrary, it is usually set to 1 and one writes $p=\{h, v, z, 1\}$. It is a trivial matter to transform from Cartesian to Projective Coordinates, and vice-versa. Difficulty arises when dealing with 2D sensors—for which the 'z' coordinate is unknown, or difficult to compute.

Since 2D sensors are incapable of directly providing the 'z' coordinate for a point, transformation between 3D sensor Cartesian Coordinates and incompletely specified 2D sensor Projective Coordinates is problematic, non-trivial, and generally computationally burdensome.

As previously noted, volumetric sensors have enabled improved performance in assembly, transport, and materials handling tasks by delivering scene geometry in Cartesian Coordinates explicitly, at real-time rates, without the computational burden associated with transforming information in Projective Coordinates to Cartesian Coordinates, thus freeing guidance devices to focus their computational power on object recognition, inspection, and the flexible guidance of autonomous systems.

Although, compared with the use of CMMs and 2D sensors, the use of volumetric sensors to obtain 3D information is still in its nascent stages in many automation contexts, the problem of registration is a shared problem. There are several methods in the prior art which deal with the registration of volumetric sensors into external coordinate spaces for manufacture or materials handling. These methods tend to group into a few categories Fixed Monuments and Calibration Patterns
  U.S. Pat. No. 6,822,748—Registers a scanning profilometer via a specially-designed monument on a turntable using a version of the ICP algorithm
  U.S. Pat. No. 10,228,864—Registers multiple 3D sensors using 2D information via a specially designed monument on a turntable
  U.S. Pat. No. 10,661,442—Registers a robot-mounted 3D sensor via a specially designed monument
  U.S. Pat. No. 10,421,189—Registers fixed 3D sensors via a printed calibration pattern mounted to a robot
  U.S. Pat. No. 8,224,071—Registers points from a 3D sensor using various planes of a previously-modeled polyhedral reference object
Random Targets
  U.S. Pat. No. 9,445,079—Registration via keyboard actuation and feedback.
  U.S. Pat. No. 9,251,590—Registration using environment as a model, then matching point clouds against the model.
Plane Targets
  U.S. Pat. No. 10,088,553—Partial pose using ground plane.

Accurate sensor calibration and sensor registration is fundamental to the success of vision-guided automation. Sensor calibration, i.e. the determination of intrinsic sensor parameters, may be performed in a controlled laboratory environment before installation at a customer site.

Sensor registration, however, is the determination of extrinsic sensor parameters. Extrinsic parameters must be determined on site, where the environment is less controlled. As a practical matter, in such environments measurement noise tends to increase when compared with laboratory environments. There are multiple practical difficulties, frequently addressed in the prior art, with the use of depth information in the registration of volumetric sensors.

Many but not all volumetric sensors produce depth maps with lower spatial resolution and lower signal-to-noise than grayscale or color images produced by 2D sensors. It takes more algorithmic and/or target design effort to reliably compute the coordinates of a designated point or line with a given level of parameter uncertainty using a volumetric sensor than it does using a 2D sensor.
  Not all volumetric sensors are delivered with a pre-integrated 2D sensor (see, for example, the series of U.S. patents describing methods for integrating Lidar and 2D cameras: U.S. Pat. Nos. 10,726,579; 10,838,049; 10,841,496; and so on). Thus, 2D information for calibration of volumetric sensors is not necessarily obtainable.
  Even in those cases where a volumetric sensor produces depth maps and integrated 2D image maps, experience shows that it is often the case that the calibration between the Cartesian depth map coordinate system and the 2D image map perspective coordinate system is somewhat faulty.
  Registration targets designed with printed patterns, delicate designs, and complicated objects tend to decay in quality quickly in the manufacturing environment. They become unusable quickly and often do not survive cycles of retrieval, use and storage. Registration targets should be simple and nearly indestructible.

The following U.S. patent documents are related to at least one embodiment of the present invention: U.S. Pat. Nos. 10,088,553; 10,552,981; 10,795,006; 10,812,778; 10,841,562; 2014/0125772; 2016/0055268; 7,275,008; 9,420,265; 6,321,137; and 8,989,897.

The following publications are related to at least one aspect of the present invention:
"Efficient and Accurate Registration of Point Clouds with Plane to Plane Correspondences" Foerstner, Wolfgang [CVF, ICCV workshop];
"A Direct Method for Estimating Planar Projective Transform" Chi, et al;
"Fast Geometric Fit Algorithm for Sphere Using Exact Solutions" Yd, Sumith;
"Image Alignment and Stitching: A Tutorial" Szeliski, Richard {Computer Graphics and Vision, v2(1) (2006) p 1-104;
"High-Precision Registration of Point Clouds Based on Sphere Feature Constraints" Huang, et al {Sensors 2017, 17, 72}; and
"Least-Squares Fitting Algorithms of the NIST Algorithm Testing System" Shararji, Craig [J Res Natl Inst Stand. Technol. 103, 633 [1998]).

SUMMARY OF EXAMPLE EMBODIMENTS

An object of at least one embodiment of the present invention is to provide a method and apparatus for robustly and accurately registering a volumetric or 3D sensor with respect to an autonomous manipulator or system (e.g., a robot) so that, together with computational means or control logic, the sensor may be capable of accurately gauging the position and orientation of a workpiece and appropriately guiding the autonomous system in its interaction with the workpiece.

Another object of at least one embodiment of the present invention is to provide a method and apparatus for obtaining registration parameters between autonomous manipulators and volumetric (3D) sensors by means of simple registration targets and depth images alone. The method does not rely upon information from 2D color or grayscale images; whether of a registration target, fiducial, or reference field. The registration target(s) is/are notably simple, consisting of 3D shape primitives without printed patterns or other 2D features. This method delivers registration parameters with asymptotically optimal uncertainty.

Other objects of at least one embodiment of the present invention are to provide methods and apparatus or systems to:
1) Register the volumetric sensor's depth coordinate system without using 2D image data, thus insuring independence of the method from any requirement for a pre-integrated 2D sensor;
2) Register using a geometrically simple target with no printed matter on its face, thus insuring ease of manufacture and extended lifetimes in a manufacturing environment; and
3) Register using 3D surfaces directly computed from the depth map, thus maximizing the signal to noise ratio (see Asymptotics discussion in the APPENDIX herein).

Yet still another object of at least one embodiment of the present invention is to provide a method and apparatus or systems for obtaining extrinsic registration (pose) parameters for volumetric (3D) sensors. Sensor poses are obtained from multiple depth images alone without relying upon information from 2D features of the registration target. Such features are obtained with low spatial resolution in a depth image, and are thus ill-suited for registration purposes. The registration target(s) is/are notably simple: consisting of single simple geometric primitive(s).

Yet, a further object of at least another embodiment of the present invention is to provide a method and system which address the disadvantages of the prior art: to improve accuracy and to simplify the use and maintenance of volumetric sensor registration subsystems in quality assurance, robotic assembly and materials handling applications. In keeping with these goals and other goals which will become apparent in the description of the embodiment of the present invention, the inventive characteristics of the method and apparatus include simpler manufacture, simpler components, and more robust functionality. Higher accuracy from improved algorithmics reduces cost, improves maintainability of the hardware components, software components, simplifies installation, and increases accuracy.

In carrying out the above objects and other objects of at least one embodiment of the present invention, a method of registering a 3D sensor with an autonomous manipulator is provided. The method comprises providing a 3D sensor having a field of view and a sensor coordinate system, providing an autonomous, vision-guided manipulator having a work envelope and a manipulator coordinate system, and providing a registration target. The method includes moving the target relative to the sensor in the field of view of the sensor in the work envelope to obtain a plurality of depth maps or images of the target. The depth maps or images are processed to obtain a plurality of extrinsic registration parameters between the manipulator and the sensor.

The manipulator may comprise an industrial robot.

The 3D sensor may comprise a volumetric sensor configured to observe an object in the work envelope of the manipulator.

The parameters may comprise poses which relate the sensor coordinate to the manipulator coordinate system.

The registration target may comprise an object having a rigid, primitive, geometric shape and without discriminative, 2D image features.

The registration target may comprise a part of the manipulator positioned at a distal end of the manipulator.

The registration target may comprise an object different from the parts of the manipulator.

The method may further comprise processing the parameters to link coordinates of the sensor to coordinates of the manipulator wherein the sensor and the manipulator are registered into a common coordinate frame.

The shape may comprise one of a planar shape, a spherical shape, a right truncated cone shape, a tori shape and a tetrahedron shape.

The registration parameters may have asymptotically optimal uncertainty.

The method may further comprise mounting the target on a distal end of the manipulator and causing the manipulator to move the target in the field of view of the sensor.

The sensor may be configured to accurately gauge the position and orientation of workpiece and provide signals to enable the manipulator to interact with a workpiece.

The registration target may comprise an object having a rigid, primitive, geometric shape with discriminative 2D image features and wherein the sensor includes a 2D image source.

Further in carrying out the above objects and other objects of at least one embodiment of the present invention, a system for registering a 3D sensor with an autonomous manipulator is provided. The system comprises a registration target and control logic configured to process depth maps or images of the target provided by the 3D sensor during relative movement between the sensor and the target to obtain a plurality of extrinsic registration parameters between the manipulator and the sensor.

The parameters may comprise poses which relate a coordinate system of the sensor to a coordinate system of the manipulator.

The registration target may comprise an object having a rigid primitive shape and without discriminative 2D image features.

The registration target may comprise a part of the manipulator positioned at a distal end of the manipulator.

The registration target may comprise an object different from the parts of the manipulator.

The control logic may be configured to process the parameters to link coordinates of the sensor to coordinates of the manipulator to register the sensor and the manipulator into a common coordinate frame.

The shape may comprise one of a planar shape, a spherical shape, a right truncated cone shape, a tori shape and a tetrahedron shape.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in this application, the term "2D target" or "2D registration target" refers to any rigid single or multi-layer featureless component having a surface to which a membrane or film layer having a printed 2D calibration pattern can be affixed or applied. The 2D target may be made of most any material including polymers and other plastics, as well as composite materials. Furthermore, the target and, particularly, the surface to be covered can be any part of an assembly or device manufactured by any of various methods, such as, without limitation, conventional molding, or otherwise fabricated.

Figure 2:
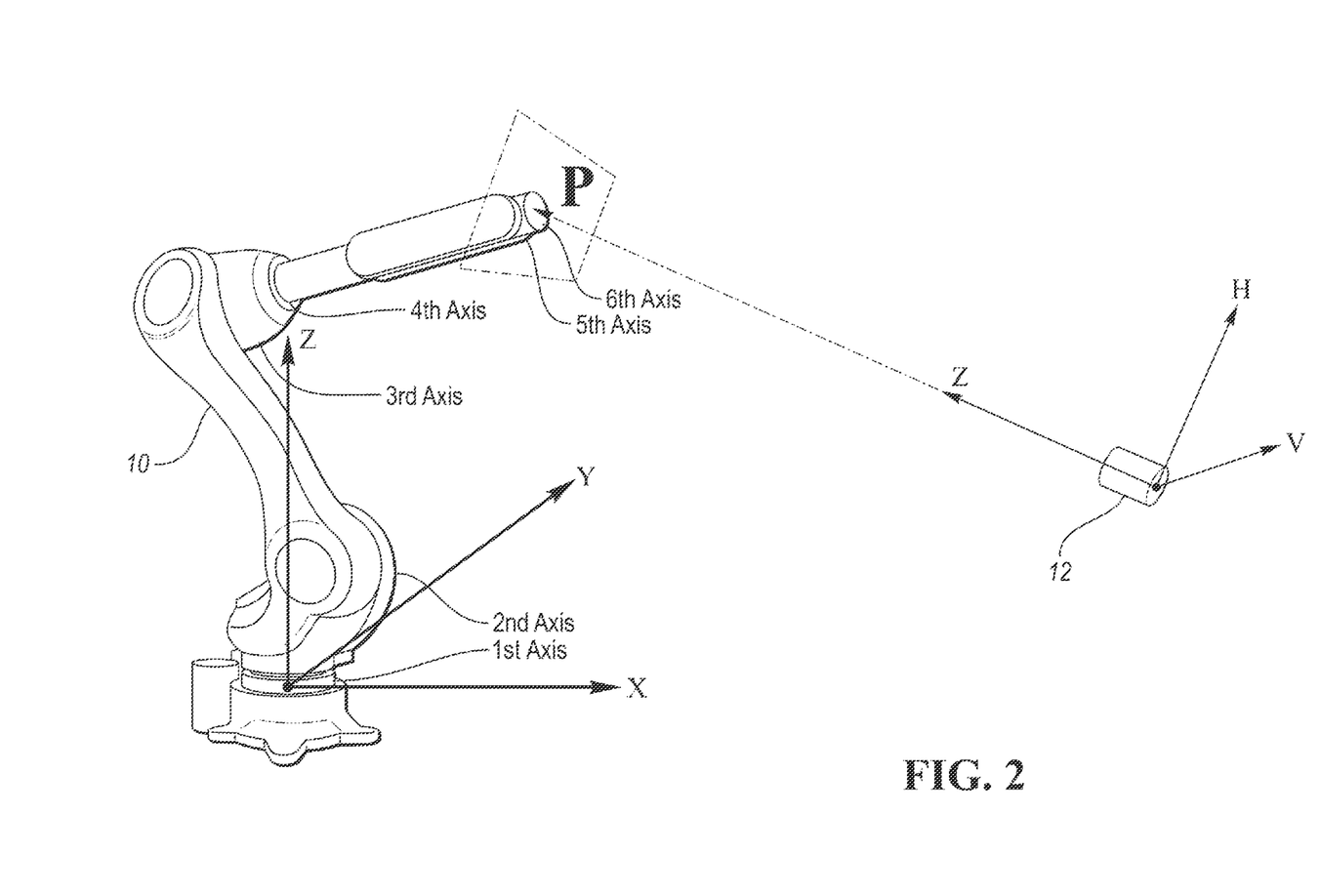
FIG. 2 is a combined schematic and graphical view showing a featureless plane, P, mounted on J6 of an industrial robot, being presented to a volumetric sensor; the plane is presented at multiple poses to the volumetric sensor, which measures the plane coordinates in the sensor's coordinate system and stores the measurements along with the coordinates of the plane as determined in the robot's coordinate system; by comparing multiple such stored relationships, the sensor is taught to transform coordinates between the sensor coordinate system and the robot coordinate system.

Referring again to the drawing figures, one preferred embodiment of the inventive ideas described above is a method of registering a volumetric sensor 12 (i.e., 3D) using a flat, featureless target, P, mounted on J6 (i.e. $6^{th}$ joint) of a robot 10 as shown in FIG. 2. Registration using this improved apparatus requires no human interaction during the registration stage. This method embodies a robust algorithm which is designed to optimize signal to noise ratios.

The registration method is outlined as follows:
1. The volumetric sensor is configured to observe a robot's addressable work envelope or volume. The volumetric sensor may be located in a fixed position or may be mounted to a robot's end-effector.
2. In a preferred embodiment the robot carries an unmarked, flat, and featureless planar target affixed to the face of its final joint. The plane target should be large enough to subtend a non-trivial fraction of the volumetric sensor's field of view at the furthest extent of the robot's planned work volume—for instance 1% or more of the field of view. (The size requirement is approximate and arises from consideration of a typical volumetric sensor's effective resolution of approximately 3×3 pixels at VGA resolution, or 7×7 pixels at SVGA resolution. Volumetric sensors with better resolution can function with a smaller plane target.)
3. The robot's tool coordinate system should be arranged so that the Z-axis is perpendicular to the target, the X and Y axes lie along the face of the target, and the origin of the tool coordinate system lies on the target. The direction of the Z-axis and the rotations of the X- and Y-axes on the face of the planar target may be configured as convenient. The equation of the target plane, o, in the robot's tool coordinate system is thereby $$o^t \cdot p_i = \begin{pmatrix} 0 \\ 0 \\ 1 \\ 0 \end{pmatrix}^t \begin{pmatrix} x \\ y \\ z \\ 1 \end{pmatrix} \Leftrightarrow z = 0$$

4. The volumetric sensor is configured to provide depth maps to a computation means.
5. The computation means or control logic is configured with a plane-detection algorithm, of which there are many. (A person of ordinary skill in the art can choose one according to his/her requirements.)
6. The target is moved to at least three positions within the robot's addressable volume, stopping occasionally, as needed, while being presented to the volumetric sensor by varying the positions and orientation of the target in 5 degrees of freedom. (It is unnecessary to vary the rotation of the target about the Z-axis since planes are isomorphic to rotation about the Z-axis. The at least three positions should not form a degenerate triple by sharing a normal.)
7. Each time the sensor target stops, indexed by 'i', the computational means or control logic locates the voxels comprising the planar target and computes the equation $$\pi_i^s \cdot p_i^s = \begin{pmatrix} a \\ b \\ 1 \\ d \end{pmatrix}_i^t \begin{pmatrix} x \\ y \\ z \\ 1 \end{pmatrix}_i \Leftrightarrow a_i x_i + b_i y_i + z_i - d_i = 0$$

describing the target plane in sensor coordinates. The computational means records the robot's tool transform, expressed in the desired world coordinate system of the automation system. The transform $T_i$ may be read directly from a robot controller.
8. Expressed in terms of the unknown transformation X relating sensor coordinates to world coordinates we may write a series of equations for the unknown X:

$$(X^{-1})^t \cdot \pi_i^s = (T_i^{-1})^t \cdot o$$

9. This series of equations may be solved via any number of means. One preferred embodiment solves via SVD.

Referring again to the drawing figures, embodiments of the present invention function to perform registration between 3D volumetric sensors without reliance upon information from 2D sensors are disclosed; their mechanical and conceptual simplicity improve upon methods in the prior art.

In one preferred embodiment, the apparatus consists of one or more volumetric sensors configured to observe a rigid planar target object as it traverses an assembly or inspection station. In a "continuous robot guidance" embodiment the robot clock is synchronized with sensor clocks using a time synchronization protocol such as the precision time protocol specified by the IEEE 1588 standard. In a "stop-and-go" control embodiment such a time synchronization is optional.

The rigid planar target object is moved to a series of target positions within the field of view of the volumetric sensor.

In a "stop-and-go" embodiment the robot carrying the target object comes to rest, whereupon it transmits the robot's tool pose to a computing means; likewise, coincident with the robot's halt, the 3D information from the volumetric sensor(s) is used to compute the coordinates of the resting plane in the coordinate system of the volumetric sensor(s). The computed plane coordinates are transmitted to the computing means, and the correspondence between the tool pose and the plane coordinates is noted. Image processing methods for segregating the planar target from its background environment and then computing the coordinates of the plane are well-known to the art.

In a "continuous robot guidance" embodiment the robot does not come to rest. It transmits its tool pose while the planar target is in motion, along with a time stamp which serves to link the tool pose with the synchronized time. The 3D information from the volumetric sensor(s) is used to compute the coordinates of the plane as above, taking care to synchronize data with the robot's time stamp.

Figure 3:
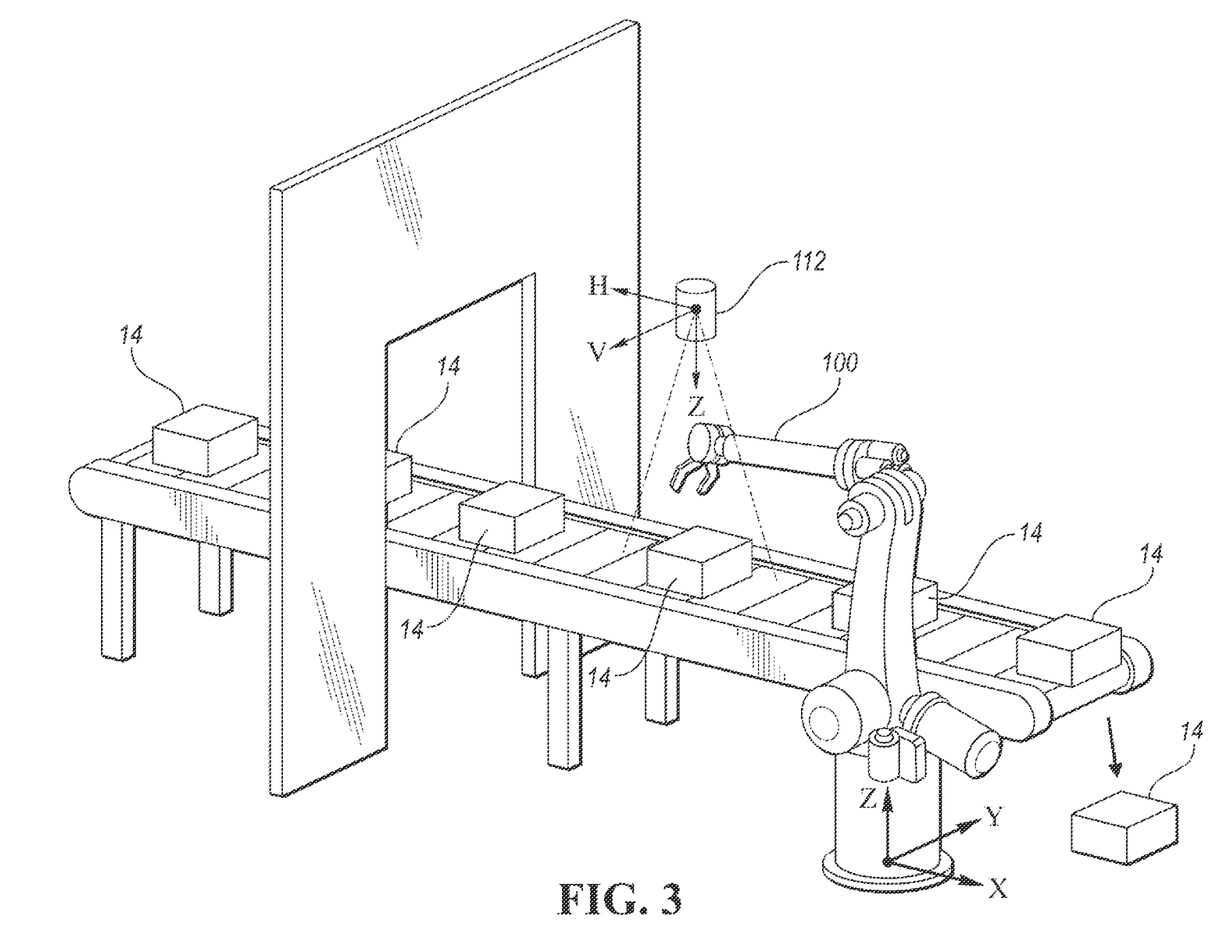
FIG. 3 is a schematic perspective view showing a robot and a workpiece on a conveyor, with a volumetric sensor having a field-of-view, a sensor coordinate system, and a robot coordinate system; for registration purposes, the robot is configured to present a calibration target (such as a featureless plane) to the sensor at multiple target positions; the sensor is thereby taught to transform coordinates between its internal coordinate system and the robot's coordinate system, whereupon the sensor is able to measure the location and orientation of target objects in the robot's coordinate system; in other words, after registration, the volumetric sensor is able to direct the robot to interact with target objects within the sensor's field of view.

Referring specifically now to FIGS. 2 and 3, in one embodiment, the planar target, p, is 350 mm×350 mm in size, coated with a matte gray industrial paint, affixed to a 6-axis industrial robot's tool face (J6) moving at no more than 250 mm per second. The planar target transits several arcs in the field of view of one volumetric sensor aimed to view a portion of an object which travels along an assembly line. The sensor is placed approximately 2000 mm from the observable portion of the object. The sensor has a field of view of approximately 45 degrees×45 degrees and acquires a new point cloud of position data 60 times per second.

Alternative Embodiments a) Robot carries target viewed by several sensors
b) Multiple robots; multiple sensors
c) Robot carries sensor(s) which view(s) fixed registration target
d) Robot carries sensor(s) which view(s) registration target mounted to robot
e) Registration target may be sphere, cone, torus, tetrahedron, . . .
f) Registration is performed while there is relative motion between target and sensor (as described above)
g) Registration frequency
  1. Happens just once during initial installation
  2. Happens periodically during lulls in manufacturing process
  3. Happens when there is cause for concern—perhaps a sensor got 'bumped' or a new robot is swapped in . . .

To conclude the registration process, the series of robot tool poses is linked with the series of sensor computations of plane coordinates, using the time stamped data as needed. The computing means operates to compute the sensor registration transformation(s), and ancillary data such as a person versed in the art might find relevant to coordinate transformation operations: for example, confidence intervals and other statistical parameters. Sample methods are described above.

During the registration process, a computer workstation, or other display means, may optionally display helpful information to a user and offer the opportunity for human intervention in the registration process. For example, this may be by prompting a user for configuration parameters, displaying a representation of the stages in the registration process, and displaying some abstract indication of the reliability of the results. The computed coordinate transformation(s) will ultimately be used to guide a robot 100 by linking the sensor coordinates (of sensor 112) of objects 14 to the robot coordinates of objects 14 (see FIG. 3).

Alternative embodiments of the present invention will immediately suggest themselves to those versed in the present state of the art of autonomous manipulators, materials handling, robotics, artificial intelligence, and/or vision-guided robotics. To list a few examples:

In felicitous circumstances the flat face of a robot's J6 (i.e., $6^{th}$ joint) itself may be used as the planar target—thereby eliminating the need for a separate registration target, irrespective of its simplicity, and taking advantage of the fact that the robot's tool transformation is condign in terms of autonomous manipulators or conveyances other than robots.

The planar target may not lie parallel with the face of an industrial robot's J6 joint, but may lie in a known, fixed relationship thereto;

The target may be fixed and the sensor may be mounted to a robot.

Both the target and the sensor may be mounted to different robots.

One or more sensors may be positioned at various points to be registered simultaneously.

The target may be a different simple geometric shape.

Alternative Embodiments

In a second embodiment the target is a sphere.
1. The volumetric sensor is configured to observe a robot's addressable work envelope or volume.
2. The robot carries an unmarked and featureless spherical target. The sphere should be large enough to subtend a reasonable area (for example 1% or more) within the volumetric sensor's field of view at the furthest extent of the robot's planned work volume.
3. The robot's tool coordinate system should be arranged so that the sphere's centroid is at the origin of the tool coordinate system $$o = \begin{pmatrix} 0 \\ 0 \\ 0 \\ 1 \end{pmatrix}$$

4. The volumetric sensor is configured to provide depth maps to a computation means.
5. The computation means is configured with a sphere-measurement algorithm, of which there are many (see NIST paper and see sphere publications noted above).
6. The target is moved to at least three positions within the robot's addressable volume, stopping periodically as needed while being presented to the volumetric sensor by varying the position of the target in 3 degrees of freedom. (It is unnecessary to vary the rotation of the target. The at least three positions should not be degenerate in that they lie upon a common line.)
7. Each time the sensor samples, indexed by 'i', the computational means or control logic records the robot's tool transform, $T_i$, expressed in the desired world coordinate system of the automation system. The transform $T_i$ may be read directly from a robot controller. The computational means extracts the voxels lying on the surface of the sphere and uses a sphere fitting algorithm (See Huang and Yd) to compute and record the centroid of the sphere $c_i^s$ expressed in the sensor coordinate system 8. One may write a series of equations for the unknown transformation X relating sensor coordinates to world coordinates:

$$X \cdot c_i^s = T_i \cdot o$$

9. This series of equations may be solved for X via any number of means. One preferred embodiment solves via SVD.

In a third embodiment the target is a right (truncated) cone.

1. The volumetric sensor is configured to observe a robot's addressable work envelope or volume.
2. The robot carries an unmarked and featureless right cone target. The cone should be large enough to subtend 1% of the pixels in the volumetric sensor's field of view at the furthest extent of the robot's planned work volume.
3. The robot's tool coordinate system should be arranged so that the cone's apex is at the origin of the tool coordinate system $$o = \begin{pmatrix} 0 \\ 0 \\ 0 \\ 1 \end{pmatrix}$$

The cone's normal defines the normal of the tool coordinate system.
4. As above.
5. The computational means or control logic is configured to extract the voxels lying on the surface of the cone and uses a fitting algorithm (See publications of Huang and Yd above) to compute and record the apex of the cone $c_i^s$ expressed in the sensor coordinate system, and the normal plane of the cone in sensor coordinates, $\pi_i^s$
6. The target is moved to at least three non-colinear positions within the robot's addressable volume, stopping periodically as needed while being presented to the volumetric sensor by varying the position of the target in 5 degrees of freedom.
7. Each time the sensor samples, indexed by 'i', the computational means records the robot's tool transform, $T_i$, expressed in the desired world coordinate system of the automation system. The transform $T_i$ may be read directly from a robot controller. We may write a series of equations for the unknown transformation X relating sensor coordinates to world coordinates:

$$X \cdot c_i^s = T_i \cdot o$$

$$(X^{-1})^t \cdot \pi_i^s = (T_i^{-1})^t \cdot o \qquad 1.$$

8. This series of equations may be solved for X via any number of means.

Other primitive shapes will suggest themselves to persons of ordinary skill in the art: for example, tori, tetrahedrons, etc.

Optionally, in the event the volumetric sensor is fitted with an additional 2D image source, the 2D image source may be calibrated at the same time as the 3D source by affixing a printed 2D registration target to the simple geometric targets described above by means well-known to the art.

APPENDIX—BACKGROUND CONCEPTS AND MATHEMATICAL NOTATION

Registration Process

Viewed abstractly there are three possible configurations for registration: a robot-mounted target is moved in the FOV of a fixed sensor, a robot-mounted sensor is moved to view a fixed target, or a robot-mounted sensor and robot-mounted target are both moved. We will provide a mathematical description for the first configuration, but modification of the herein described invention to account for the second and third configurations should be apparent to a person of ordinary skill in the art.

Regardless of the configuration, a sensor has a finite sampling rate: $\Delta t$. Since the time available for registration is limited, $t < t_M$, the number of samples M for registration is limited by $$M = \frac{t_M}{\Delta t}.$$

One can write D for the characteristic dimension of a volumetric sensor, so that the sampling area, in pixels, is proportional to $D^2$.

Standard Error of Sample Mean

When estimating a mean from sample measurement, it is notable that the estimated mean depends on the number of measurements used for its estimate. The larger the number of samples, the better the estimate. The error in the estimation of a sample mean from a number of measurements reduces by the square root of the number of measurements:

$$\sigma_{\bar{x}}(N) = \frac{\sigma}{\sqrt{N}}.$$

Points

The point p is represented as a homogeneous 4-vector $$p = \begin{pmatrix} x \\ y \\ z \\ 1 \end{pmatrix}.$$

The transpose of p is written $p^t = (x\ y\ z\ 1)$.

The distance from a point p to a point q is $d(p, q) = \sqrt{(p-q)^t \cdot (p-q)}$.

Two points are identical just in case $d(p, q) = 0$.

The uncertainty in the measurement of the location of a point can be denoted by $\sigma$.

Lines

A line $\lambda$ is represented with six parameters as a pair of homogeneous 4-vectors $\lambda = \{a, b\}$ where $\{a, b\} \in R^4 \times R^4$.

The distance from a point p to a line $\lambda$ is $$d(p, \lambda) = \frac{|(p-a) \times (p-b)|}{|b-a|}$$

The distance from a point to a line is zero just in case that point lies on the line. Thus, the set of points lying on a line $\lambda$ is the set $p \in \Lambda$ in $R^4$. Its membership is computed via $$p \in \Lambda(\lambda) \leftrightarrow |(p-a) \times (p-b)| = 0$$

If N points, measured with uncertainty σ, are used to determine a line the uncertainty in the parameters of the line is proportional to $\sigma/\sqrt{N}$.

Planes

A plane π is represented as a 4-vector $$\pi = \begin{pmatrix} a \\ b \\ 1 \\ d \end{pmatrix}$$

with three parameters. Multiplying the transpose of π by the homogeneous point $$p = \begin{pmatrix} x \\ y \\ z \\ 1 \end{pmatrix}$$

(taking the dot product) and setting to zero gives the plane equation $$\pi^t \cdot \begin{pmatrix} x \\ y \\ z \\ 1 \end{pmatrix} = ax + by + z + d = 0.$$

The distance from a point p to a plane π is given by $$d(p, \pi) = \frac{|\pi^t \cdot p|}{\sqrt{\pi^t \cdot \pi - d^2}}$$

The distance from a point to a plane is zero just in case that point lies on the plane. Thus, we write the set of points lying on a plane π as the set p∈Π where $$p \in \Pi(\pi) \leftrightarrow \pi^t \cdot p = 0$$

If a plane is determined from the points in a region with characteristic dimension N (such that the area of the region is proportional to $N^2$), the uncertainty in the parameters of the plane is proportional to $\sigma/\sqrt{N^2}$.

Asymptotics

A 2D sensor can be used to measure the location of a point, with uncertainty $\sigma_2$, or a 2D line, with uncertainty proportional to $\sigma_2/\sqrt{N}$. If the measurement is repeated a maximum of M times to obtain a registration transform, the uncertainty in the result is proportional to $\sigma_2/\sqrt{M}$ for a point, or $\sigma_2/\sqrt{MN}$ for a line.

A volumetric sensor can be used to measure the location of a point with uncertainty $\sigma_3$, or a line with uncertainty $\sigma_3/\sqrt{N}$, or a surface with uncertainty proportional to $\sigma_3/\sqrt{N^2}$. If the measurement is repeated a maximum of M times for a registration, the uncertainty in the result is proportional to $\sigma_3/\sqrt{M}$ for a point, or $\sigma_3/\sqrt{MN}$ for a line, or $\sigma_3/\sqrt{MN^2}$ for a surface.

Regardless of the point measurement uncertainty difference between 2D and 3D sensors ($\sigma_2$ versus $\sigma_3$) the asymptotically best registration performance is given by registration using surfaces via a volumetric sensor: i.e. $\sigma_3/\sqrt{MN^2}$. The method disclosed herein takes advantage of this observation.

Aside from the embodiments of the invention that have been described, many additional embodiments could be created via modification or adaptation without departing from the spirit of the present invention or the scope of the following claims. The present invention is so completely revealed and additional advantages so obvious to others skilled in the arts of machine vision, 3D non-contact depth sensors, robot calibration, or related fields that the invention could be easily adapted for a variety of applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of registering a 3D sensor with an autonomous manipulator, the method comprising:
   providing a 3D sensor having a field of view and a sensor coordinate system;
   providing an autonomous, vision-guided manipulator having at least three degrees of freedom, having a work envelope and having a manipulator coordinate system;
   providing a single, unmarked and featureless a registration target;
   moving the target relative to the sensor in the at least three degrees of freedom in the field of view of the sensor in the work envelope to obtain a plurality of depth maps of the target wherein moving includes varying the position of the target relative to the sensor to at least three positions which are not degenerative;
   directly computing a 3D surface based on the depth map at each of the three positions to maximize signal to noise ratio; and
   processing the 3D surfaces to obtain a plurality of extrinsic registration parameters between the manipulator and the sensor.

2. The method as claimed in claim 1, wherein the manipulator comprises an industrial robot.

3. The method as claimed in claim 1, wherein the 3D sensor comprises a volumetric sensor configured to observe an object in the work envelope of the manipulator.

4. The method as claimed in claim 1, wherein the parameters comprise poses which relate the sensor coordinate system to the manipulator coordinate system.

5. The method as claimed in claim 1, wherein the registration target comprises an object having a rigid, primitive, geometric shape and without discriminative, 2D image features.

6. The method as claimed in claim 1, wherein the registration target comprises a part of the manipulator positioned at a distal end of the manipulator.

7. The method as claimed in claim 1, wherein the registration target comprises an object different from the parts of the manipulator.

8. The method as claimed in claim 1, further comprising processing the parameters to link coordinates of the sensor to coordinates of the manipulator wherein the sensor and the manipulator are registered into a common coordinate frame.

9. The method as claimed in claim 5, wherein the shape comprises one of a planar shape, a spherical shape, a right truncated cone shape, a tori shape and a tetrahedron shape.

10. The method as claimed in claim 1, wherein the registration parameters have asymptotically optimal uncertainty.

11. The method as claimed in claim 1, further comprising mounting the target on a distal end of the manipulator and causing the manipulator to move the target in the field of view of the sensor.

12. The method as claimed in claim 8, wherein the sensor is configured to accurately gauge the position and orientation of workpiece and provide signals to enable the manipulator to interact with a workpiece.

13. The method as claimed in claim 1, wherein the registration target comprises an object having a rigid, primitive, geometric shape with discriminative 2D image features and wherein the sensor includes a 2D image source.

14. A system for registering a 3D sensor with an autonomous manipulator, the system comprising:
a single, unmarked and featureless registration target; and
control logic configured to process depth maps of the target provided by the 3D sensor to obtain 3D surfaces during relative movement between the sensor and the target in at least three degrees of freedom of the manipulator wherein the relative movement varies the position of the target relative to the sensor to at least three positions which are not degenerative and wherein the control logic is also configured to process the 3D surfaces to obtain a plurality of extrinsic registration parameters between the manipulator and the sensor.

15. The system as claimed in claim 14, wherein the parameters comprise poses which relate a coordinate system of the sensor to a coordinate system of the manipulator.

16. The system as claimed in claim 14, wherein the registration target comprises an object having a rigid primitive shape and without discriminative 2D image features.

17. The system as claimed in claim 14, wherein the registration target comprises a part of the manipulator positioned at a distal end of the manipulator.

18. The system as claimed in claim 14, wherein the registration target comprises an object different from the parts of the manipulator.

19. The system as claimed in claim 14, wherein the control logic is configured to process the parameters to link coordinates of the sensor to coordinates of the manipulator to register the sensor and the manipulator into a common coordinate frame.

20. The system as claimed in claim 16, wherein the shape comprises one of a planar shape, a spherical shape, a right truncated cone shape, a tori shape and a tetrahedron shape.

* * * * *